C. J. HOWE.
WIND SHIELD.
APPLICATION FILED JAN. 31, 1917.
1,283,775.
Patented Nov. 5, 1918.
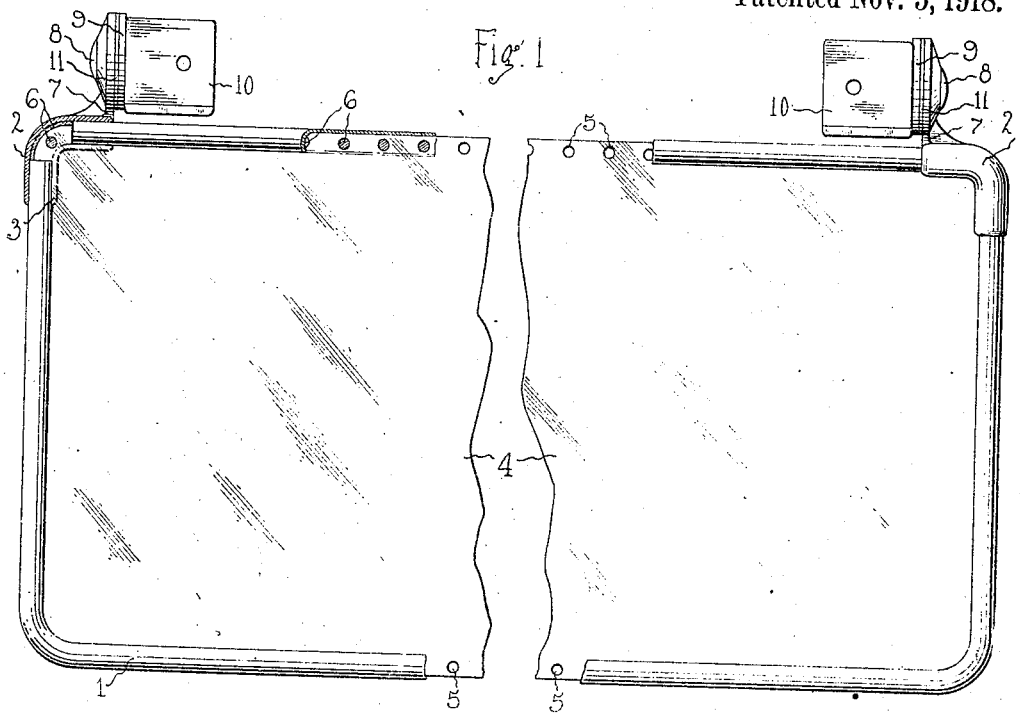
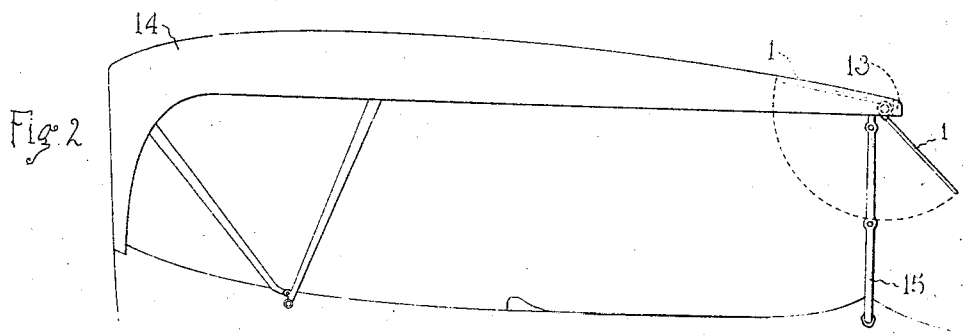
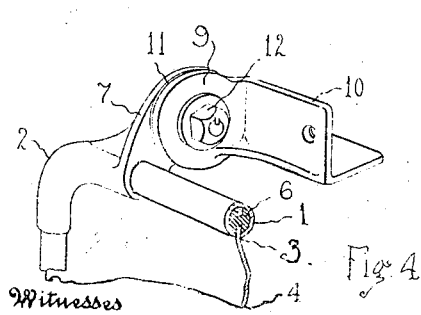
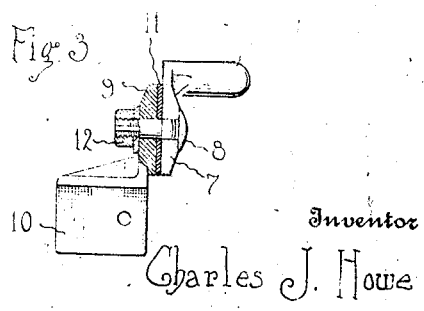
Inventor
Charles J. Howe
Witnesses
Arthur I. Draper
Karl H. Butler
By
Attorneys

UNITED STATES PATENT OFFICE.

CHARLES J. HOWE, OF DETROIT, MICHIGAN.

WIND-SHIELD.

1,283,775.  Specification of Letters Patent.  Patented Nov. 5, 1918.

Application filed January 31, 1917. Serial No. 145,614.

*To all whom it may concern:*

Be it known that I, CHARLES J. HOWE, a citizen of the United States of America, residing at Detroit, in the county of Wayne and State of Michigan, have invented certain new and useful Improvements in Wind-Shields, of which the following is a specification, reference being had therein to the accompanying drawings.

This invention relates to an auxiliary shield for automobiles and has special reference to a shield that may be used in conjunction with the ordinary windshield of an automobile.

The primary object of my invention is to furnish an automobile or vehicle top with an adjustable shield that may be placed at various angles relative to the automobile top or a windshield, to prevent snow and sleet from contacting with the windshield and obscuring vision therethrough; to serve as a deflector of rain or other matter and as a reflector of light rays, and to prevent glare of light which may tend to temporarily blind or bewilder the operator of an automobile.

Another object of my invention is to provide an auxiliary windshield that may be readily attached to a vehicle top and positioned therein when it is desired to fold the top. In this manner the auxiliary windshield will always be in position for use when the vehicle top is set up.

A further object of my invention is to provide a windshield having a transparent or translucent plate and a frame attached to the marginal edges of the plate in a manner that prevents the same from becoming accidentally displaced and at the same time retain the plate taut, particularly when celluloid or a flexible material is used.

A still further object of my invention is to provide an auxiliary windshield wherein the parts are constructed with a view of reducing the cost of manufacture, and at the same time retain those features by which simplicity of construction, durability, and ease of installing are secured. With such ends in view, my invention resides in the novel construction, combination and arrangement of parts to be hereinafter specifically described and then claimed.

Reference will now be had to the drawing, wherein—

Figure 1 is a front elevation of the auxiliary shield, partly broken away and partly in section;

Fig. 2 is a side elevation of the auxiliary shield in connection with a vehicle top and windshield;

Fig. 3 is a detail sectional view of a hinge or pivot adapted to form part of the auxiliary shield, and Fig. 4 is a perspective view of the same.

In the drawings, 1 denotes a rectangular frame and this frame can be conveniently made of metallic tubing, similar to an ordinary windshield frame. As a matter of good construction the frame may be composed of two pieces of tubing, one bent to form the bottom and side rails of the frame, and the other piece of tubing used as a top rail, with the ends of the two pieces of tubing connected by elbows 2. The tubing 1 and elbows 2 are slotted or formed with slots 3 to receive the marginal edges of a transparent or translucent plate 4 that may be advantageously made of celluloid, since said material may have a color beneficial to the eyesight, particularly when encountering a glare. Besides, such material is water proof and not readily broken or injured by jars or vibrations, and may be more readily mounted in the frame than glass. The marginal edges of the plate 4 are apertured or perforated, as at 5 and the frame tubing and elbows are filled with cement 6 that will extend through the apertures or perforations and thereby anchor the marginal edges of the plate 4 within the frame. The cement 6 or material employed for holding the edges of the plate may be placed in the tubing and then the edges of the plate forced therein displacing a certain amount of cement which may be removed from the faces of the plate, or the cement may be of such nature as to be injected or poured into the tubular frame after the edges of the plate are placed therein.

The elbows 2 have the inner ends thereof provided with ears 7 which are apertured to receive the cylindrical ends or portions of bolts 8. The bolts 8 have rectangular portions mounted in ears 9 of angle brackets 10, and arranged between the ears 7 and 9 are friction washers 11 adapted to be clamped between the ears 7 and 9 by nuts 12 or other holding means on the bolts 8. The manner of articulating the ears 7 and 9 provides a friction hinge or pivotal connection between the angle bracket 10 and the elbows 2, so that the auxiliary shield may be positioned at a desired angle relative to the angle brackets. The angle brackets are adapted to be attached to the inner side of the front view or rail 13 of an automobile top 14, such top generally being attached to or resting on the upper edge of an ordinary windshield 15, as best shown in Fig. 2.

With the angle brackets 10 attached to the vehicle top, the disposition of the lugs 7 and 9 is such as to permit of the auxiliary shield being swung under the top 14 and upwardly therein, so that the shield may be carried rearwardly by the vehicle top, when the same is folded or collapsed.

With the automobile top 14 in position on the windshield 15 the auxiliary shield extends down between the windshield 15 and the front bow 13 and can be swung to and from the front side of the windshield 15 and positioned at a desired angle thereto, so that snow, sleet or rain will not obscure vision through the windshield 15. Since the plate 4 can be made of a colored material, it is apparent that glare from lamps ahead of the automobile will not temporarily blind or bewilder the operator of the automobile, and in some instances only portions of the plate 4 may be colored, while the remaining portions are transparent.

I reserve the right to attach the angle brackets 10 to the windshield 15 or suitable supports when it is desired to dispense with the top 14, and while in the drawing there is illustrated a preferred embodiment of my invention, it is to be understood that the structural elements are susceptible to such variations and modifications as fall within the scope of the appended claim.

What I claim is:—

An auxiliary shield comprising a tubular slotted frame, a plate having apertured marginal edges extending into said frame, and a cement within said frame extending through the apertures of said plate.

In testimony whereof I affix my signature in the presence of two witnesses.

CHARLES J. HOWE.

Witnesses:
 KARL H. BUTLER,
 ANNA M. DORR.